UNITED STATES PATENT OFFICE.

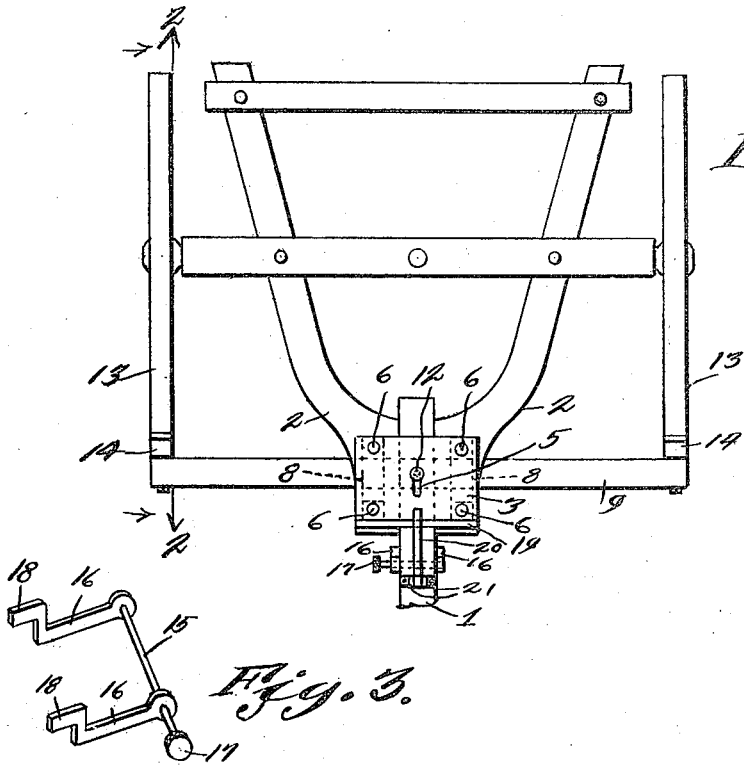

JAMES M. HUGHES, OF SOMERVILLE, ALABAMA.

VEHICLE-BRAKE.

1,244,212. Specification of Letters Patent. Patented Oct. 23, 1917.

Application filed June 4, 1917. Serial No. 172,733.

*To all whom it may concern:*

Be it known that I, JAMES M. HUGHES, a citizen of the United States, residing at Somerville, in the county of Morgan, State of Alabama, have invented a new and useful Vehicle-Brake; and I do hereby declare the following to be a full, clear, and exact description of the invention, such as will enable others skilled in the art to which it appertains to make and use the same.

The invention relates to improvements in automatic vehicle brakes.

One of its objects is to provide a device of this kind to be operated against the front wheels of a vehicle into contact with which it is brought by any backward pressure applied to the vehicle tongue, such as obtains when the vehicle is moving down hill and the pull-back chains tend to impart a backward pressure to the tongue.

Another object of the invention is the provision of means for limiting the backward movement of the tongue, so that the brake may be rendered inoperative when backing the vehicle.

Still another object is the provision of means for securing the brake in the set position, so that the vehicle may be secured on an incline without the necessity of having to exert a pull on the pull-back chains to maintain the set position of the brake.

Other objects will appear in the detailed description which follows.

It is to be understood that the invention is not to be confined to the exact construction herein disclosed, the right being reserved to make any changes or alterations falling within the scope of what is claimed.

In the drawings:

Figure 1 is a plan view of a portion of the running gear of the vehicle, showing the application of the invention thereto.

Fig. 2 is a section on the line 2—2 of Fig. 1.

Fig. 3 is a perspective view of a pair of levers used for rendering the brake inoperative when backing the vehicle.

Fig. 4 is a detail sectional view showing the manner of mounting the brake bar.

Referring to the drawings, 1 designates a tongue slidably mounted between the front ends of the front hounds 2. These front ends of the hounds are provided with top and bottom plates 3 and 4 in both of which slots 5 are formed, these slots running in the direction of the length of the tongue and being positioned in the centers of the plates, so that they are centrally disposed with reference to the center of the tongue. The plate 3 connects the two hounds on the top and the plate 4 connects them on the bottom and both are attached to the hounds by means of the bolts 6 which pass through the plates and through the hounds and receive on their lower ends the nuts 7. A strap member 8 is attached on the bottom of each hound and is secured in position thereon by the bolts 6 which attach the plates to that hound, the nuts 7 being screwed on the bolts after the strap members 8 have been attached thereto.

A transverse brake bar 9 is supported by these strap members and at its center is attached to the tongue 1 by means of the bolt 10 which passes through the slots 5 in the plates 3 and 4, the tongue 1 and the brake bar 9 and receives on its lower end the nut 11 which is screwed up against the under face of the brake bar 9. The head 12 of the bolt rests on the upper face of the plate 3 and prevents the bolt from dropping through the slot 5. The strap members 8 are of such a shape as to permit the brake bar 9 to be moved toward or away from the front wheels 13, so that the brake shoes 14 which are suitably secured to the bar may be brought into or relieved from contact with the wheels. The plates 3 and 4 in conjunction with the ends of the hounds 2 operate to support the tongue 1 in a horizontal position and the slots 5 in these plates permit a slight longitudinal movement of the tongue, the strap members 8 permitting the brake bar 9 to move and the bolt 10 assuring the movement together of both these parts.

It will be seen that the brake is exceedingly simple and inexpensive in construction, that it may be readily applied to a vehicle and that when the vehicle moves forward on the draft animals in descending a grade the brake will be automatically applied and will check such forward movement, the tongue moving rearwardly between the hounds and bringing the brake into contact with the wheels. It will be observed further that the brake is under the control of the draft animals and may be readily applied by backing them.

Provision is made for locking the brake in an inoperative position when it is desired to back the vehicle. This locking means comprises a small shaft 15 inserted transversely through the tongue 1 and just in front of the hounds 2. This shaft is designed to be easily turned in the top and carries two Z-shaped levers 16 suitably affixed to it on either side of the tongue. One end of this shaft is provided with a knurled head 17 by which it may be turned, so as to bring the Z-shaped levers 16 into contact with the front ends of the hounds 2. To render the brake inoperative so that the vehicle may be easily backed, the shaft 15 is turned, thus turning the Z-shaped levers over until their offset ends 18 rest on top of the hounds 2 when the ends of the body portions of the levers will abut the ends of the hounds and prevent the tongue 1 from moving backward between the hounds and bring the brake into contact with the wheels.

Provision is also made for locking the brake in a set position which is of advantage when the vehicle is stopped on a hill or incline. The front edge of the plate 3 is upturned forming the flange 19 and a hook member 20 is adapted to engage this flange, this hook member being pivotally connected to the tongue 1 just ahead of the small shaft 15 where it is supported between two angle plates 21 which are bolted or otherwise secured on top of the tongue. When the tongue 1 has reached the end of its backward movement between the hounds and has brought the brake into contact with the wheels, the hook member 20 can be made to engage the flange 19, thus securing the brake in the set position, since no forward movement of the tongue is possible as long as the hook member 20 and the flange 19 of plate 3 are in engagement.

What is claimed is:

1. In a device as set forth, the combination with the front hounds of a vehicle, of a pair of plates connecting the front ends of the hounds together, one plate being on top of the hounds and the other plate being on the bottom of the hounds, the plates being provided with slots positioned centrally between the hounds, a tongue slidably mounted between the hounds and between the plates, strap members attached on the bottom of the hounds, a transverse brake bar supported by the strap members and having a limited forward and backward movement therein, and a bolt passing through the slots in the plates, through the tongue and through the brake bar, whereby the tongue is permitted a limited longitudinal movement between the hounds to impart a forward or backward movement to the brake bar.

2. In a device as set forth, a vehicle tongue having a limited longitudinal movement between the front hounds, a transverse brake bar attached to the tongue and provided with a brake shoe at each end, a transverse shaft rotatably mounted in the tongue, to the fore of the front hounds, and Z-shaped levers connected to the shaft and adapted to be brought into or out of engagement with the front ends of the hounds, whereby when the tongue is at the forward extreme of its longitudinal movement it may be prevented from backward movement.

3. In a device as set forth, a vehicle tongue having a limited longitudinal movement between the front hounds, a transverse brake bar attached to the tongue and provided with a brake shoe at each end, a plate attached to the front end of the hounds and provided with an upturned flange at its forward end, and a hook member pivotally mounted on the tongue, whereby when the tongue has reached the limit of its backward movement and set the brake the hook member may be made to engage the flange to maintain the brake in the set position.

In testimony whereof I have signed my name to this specification in the presence of two subscribing witnesses.

JAMES M. HUGHES.

Witnesses:
I. D. GRIFFIN,
J. W. CURRY.

Copies of this patent may be obtained for five cents each, by addressing the "Commissioner of Patents, Washington, D. C."